US008296743B2

(12) United States Patent
Linderman et al.

(10) Patent No.: US 8,296,743 B2
(45) Date of Patent: Oct. 23, 2012

(54) COMPILER AND RUNTIME FOR HETEROGENEOUS MULTIPROCESSOR SYSTEMS

(75) Inventors: Michael D. Linderman, Redwood City, CA (US); Jamison D. Collins, San Jose, CA (US); Perry Wang, San Jose, CA (US); Hong Wang, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 1311 days.

(21) Appl. No.: 11/958,307

(22) Filed: Dec. 17, 2007

(65) Prior Publication Data

US 2009/0158248 A1    Jun. 18, 2009

(51) Int. Cl.
*G06F 9/45* (2006.01)
(52) U.S. Cl. ........................................ 717/140
(58) Field of Classification Search .......... 717/149, 717/140
See application file for complete search history.

(56) References Cited

U.S. PATENT DOCUMENTS

| | | | | |
|---|---|---|---|---|
| 5,535,393 | A * | 7/1996 | Reeve et al. | 717/149 |
| 5,774,728 | A * | 6/1998 | Breslau et al. | 717/141 |
| 6,049,668 | A * | 4/2000 | Smith et al. | 717/138 |
| 6,345,311 | B1 * | 2/2002 | Breslau et al. | 719/310 |
| 6,473,897 | B1 * | 10/2002 | Ansari et al. | 717/136 |
| 6,609,248 | B1 * | 8/2003 | Srivastava et al. | 717/147 |
| 7,065,754 | B1 * | 6/2006 | Coutant et al. | 717/146 |
| 7,620,945 | B1 * | 11/2009 | Song et al. | 717/149 |
| 7,685,596 | B1 * | 3/2010 | Webb et al. | 717/177 |
| 2005/0071526 | A1 * | 3/2005 | Brokenshire et al. | 710/52 |
| 2005/0071828 | A1 * | 3/2005 | Brokenshire et al. | 717/147 |
| 2005/0081181 | A1 * | 4/2005 | Brokenshire et al. | 717/100 |
| 2005/0081182 | A1 * | 4/2005 | Minor et al. | 717/100 |
| 2006/0112226 | A1 * | 5/2006 | Hady et al. | 711/130 |
| 2006/0123401 | A1 * | 6/2006 | O'Brien et al. | 717/131 |
| 2007/0157211 | A1 | 7/2007 | Wang et al. | |
| 2007/0169042 | A1 * | 7/2007 | Janczewski | 717/149 |

OTHER PUBLICATIONS

M.E. Vidal, L. Raschid, and J-R. Gruser. A meta-wrapper for scaling up to multiple autonomous distributed information sources. In Proceedings of the 3rd IFGIS International Conference on Cooperative Information Systems (CoopIS98), pp. 148-157. IEEE-CS Press, 1998.*

(Continued)

*Primary Examiner* — Wei Zhen
*Assistant Examiner* — Kevin Dothager
(74) *Attorney, Agent, or Firm* — Barnes and Thornburg, LLP

(57) ABSTRACT

Presented are embodiments of methods and systems for library-based compilation and dispatch to automatically spread computations of a program across heterogeneous cores in a processing system. The source program contains a parallel-programming keyword, such as mapreduce, from a high-level, library-oriented parallel programming language. The compiler inserts one or more calls for a generic function, associated with the parallel-programming keyword, into the compiled code. A runtime library provides a predicate-based library system that includes multiple hardware specific implementations ("variants") of the generic function. A runtime dispatch engine dynamically selects the best-available (e.g., most specific) variant, from a bundle of hardware-specific variants, for a given input and machine configuration. That is, the dispatch engine may take into account run-time availability of processing elements, choose one of them, and then select for dispatch an appropriate variant to be executed on the selected processing element. Other embodiments are also described and claimed.

25 Claims, 6 Drawing Sheets

OTHER PUBLICATIONS

Wang, et al., "EXOCHI: architecture and programming environment for a heterogeneous multi-core multithreaded system," Conference on Programming Language Design and Implementation, Proceedings of the 2007 ACM SIGPLAN Conference on Programming Language Design and Implementation, Jun. 11-13, 2007, San Diego, California, USA, pp. 156-166.

Wang, et al., "Accelerator Exoskeleton", Tera-scale Computing, Intel Technology Journal, vol. 11, Issue 03, Published Aug. 22, 2007, ISSN 1535-864X DOI 10.1535/itj.1103.02.

M. Annavram, E. Grochowski and J. Shen, "Mitigating Amdahl's law through EPI throttling" ISCA, 2005, pp. 298-309.

P. Dubey, "Recognition, Mining and Synthesis Moves Computers to the Era of Tera", Technology@Intel Magazine, Feb. 2005.

S. Z. Guyer, C. Lin, "Annotation language for optimizing software libraries" in Proc. of Second Conference on Domain-Specific Languages, 1999, pp. 39-52.

K. Kennedy, et al. "Telescoping languages: A strategy for automatic generation of scientific problem-solving systems from annotated libraries." Journal of Parallel Distributed Computing, v. 61, 2001, pp. 1803-1826.

E. Allen, et al. "The Fortress language specification version 1.0beta" Sun Microsystems, 2007.

K. Fatahalian, et al. "Sequia: Programming the memory hierarchy", in Proc. of ACM Conf. on Supercomputing, 2006.

Intel C/C++ Compiler, http://www3.intel.com/cd/software/products/asmo-na/eng/compilers/284132.htm. last accessed Feb. 18, 2008.

M. McCool, K. Wadleigh, B. Henderson and H.Y. Lin, "Performance evaluation of GPUs using the RapidMind development platform", in Proc. of ACM Conf. on Supercomputing, 2006.

M. Papakipos, "The PeakStream Platform: High productivity software development for multi-core processors" PeakStream Inc, 2006.

D. Tarditi, S. Puri, J. Oglesby, "Accelerator: Using data parallelism to program GPUs for General-Purpose Uses", in Proc. of ASPLOS, 2006.

I. Buck, et al., "Brook for GPUs: Stream computing on graphics hardware", ACM Transactions on Graphics, v. 23, n. 3, 2004, pp. 777-786.

W. Thies, M. Karczmarek, and S. Amarasinghe. "Streamit: A Language for Streaming Applications", in Computational Complexity, 2002.

U. Kapasi, S. Rixner, W. Dally, B. Khailany, J. Ahn, P. Mattson and J. Owens, "Programmable Stream Processors", IEEE Computer, v. 36, n. 8 pp. 54-62.

M. McCool and S. Toit, "Metaprogramming GPUs with Sh", A K Peters, 2004.

GLSL OpenGL Shading Language, http://www.opengl.org/documentation/glsl/, last accessed Feb. 18, 2008.

W. Mark, R. Glanville, K. Akeley, M. Kilgard. "Cg: A System for Programming Graphics Hardware in a C-like language", ACM Transactions on Graphics, v. 22 n. 3, 2003, pp. 896-907.

Cuda. http://developer.nvidia.com/object/cuda.html, last accessed Feb. 18, 2008.

M. Segal and Peercy, M. "A performance-oriented data parallel virtual machine for GPUs" ATI Technologies, Inc., 2006.

J. Dean and S. Ghemawat, "MapReduce: Simplified data processing on large clusters", OSDI, 2004, pp. 137-150.

V. Kuncak, P. Lam, and M. Rinard, "Role analysis", ACM SIGPLAN Notices, v. 37, 2002, pp. 17-32.

T. Millstein, "Practical predicate dispatch", in Proc. of OOPSLA, 2004, pp. 345-364.

Z. Zumsteg, et al. "Power feasibility of implantable digital spike sorting circuits for neural prosthetic systems", IEEE Transactions in Neural Systems and Rehabilitation Engineering. v. 13, 2005, pp. 272-279.

S. Chiba, "A metaobject protocol for C++", Proc. of OOPSLA, 1995, pp. 285-299.

C. Barrett and S. Berezin, "CVC Lite: A new implementation of the cooperating validity checker", Proc. of Conf. on Computer Aided Verification, 2004, pp. 515-518.

* cited by examiner

COMPILER AND RUNTIME FOR HETEROGENEOUS MULTIPROCESSOR SYSTEMS

BACKGROUND

1. Technical Field

The present disclosure relates generally to library-based parallel execution of computation tasks for multiprocessor systems.

2. Background Art

To improve performance and efficiency, some multi-core processing systems are transitioning from homogenous cores to heterogeneous systems with multiple, but different, processing elements. These heterogeneous systems may include one or more general purpose central processing units (CPUs) as well as one or more of the following: specialized accelerators, graphics processing unit(s) ("GPUs") and/or reconfigurable logic element(s) (such as field programmable gate arrays, or FPGAs). For some of these latter elements (e.g., GPUs and FPGA), there is often either none, or very limited, compiler support.

BRIEF DESCRIPTION OF THE DRAWINGS

Embodiments of the present invention may be understood with reference to the following drawings in which like elements are indicated by like numbers. These drawings are not intended to be limiting but are instead provided to illustrate selected embodiments of systems, methods and mechanisms to spread computations among multiple cores.

DETAILED DESCRIPTION

The following discussion describes selected embodiments of methods, systems and mechanisms to spread computations among multiple cores of a computing system. Although presented below in the context of heterogeneous multi-core systems, the apparatus, system and method embodiments described herein may be utilized with homogenous or asymmetric multi-core systems as well.

In the following description, numerous specific details such as system configurations, particular order of operations for method processing, specific examples of heterogeneous systems, and implementation details for embodiments of compilers, pre-compilation tools, and library routines have been set forth to provide a more thorough understanding of embodiments of the present invention. It will be appreciated, however, by one skilled in the art that the invention may be practiced without such specific details. Additionally, some well-known structures, circuits, and the like have not been shown in detail to avoid unnecessarily obscuring the present invention.

Figure 1:
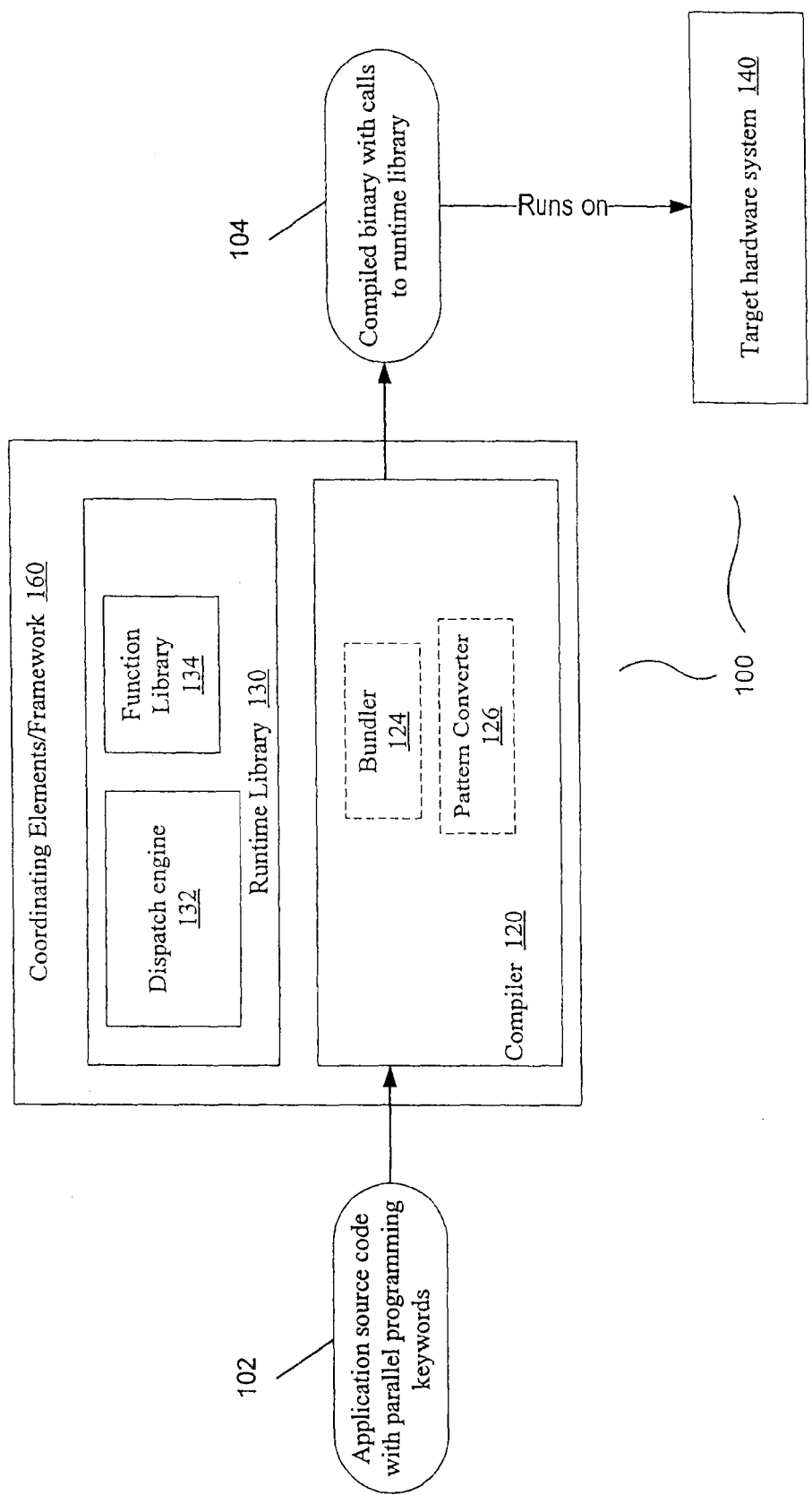
FIG. 1 is a block data-flow diagram illustrating at least one embodiment of a system to provide compilation and run-time dispatch for parallel-programming constructs on a multi-core system.

FIG. 1 illustrates at least one embodiment of a system 100 capable of performing library-based compilation to support the dynamic (e.g., during runtime) distribution of computations of a program across multiple cores of a target hardware system 140. FIG. 1 illustrates that the system 100 includes the target hardware system 140 as well as coordinating elements 160 that may sometimes referred to herein as the "framework".

The coordinating elements 160 are those elements that coordinate the compilation and dispatch of tasks based on parallel programming keywords in application source code 102, such that the tasks may be dynamically allocated among the multiple cores of the target hardware system 140. FIG. 1 illustrates that the coordinating elements 160 include a compiler 120 and a runtime library 130. The coordinating elements 160 may be implemented as software instructions loaded onto a tangible computer-readable medium, such as a memory storage device. Alternatively, the coordinating elements 160 may be implemented in hardware, firmware, or any combination of software, firmware, and hardware.

The target hardware system 140 may include multiple cores. For example, the target hardware system 140 may include multiple homogenous cores having the same instruction set architecture (ISA) and functionality. For at least one other embodiment, however, at least one of the cores may be heterogeneous with respect to one or more of the other cores of the target hardware system 140. For such embodiment, the cores of the target hardware system 140 may vary from one another in terms of ISA, functionality, performance, energy efficiency, architectural design, size, footprint or other design or performance metrics. For at least one other embodiment, at least one of the cores may be asymmetric with respect to one or more of the other cores of the target hardware system 140. For such embodiment, the cores of the target hardware system 140 may have the same ISA but may vary from one another in other design or functionality aspects, such as cache size or clock speed.

These diverse cores may feature ISAs and functionality that significantly differ from general purpose CPU cores (though some of the other cores in the target hardware system 140 may be general purpose CPU cores). For one example embodiment, which in no way should be taken to be an exclusive or exhaustive example, the target hardware system 140 may include one or more general purpose CPUs along with one or more graphics processing units (GPU). For at least one other example embodiment, the target hardware system 140 may include one or more reconfigurable logic elements, such as a field programmable gate array. Other types of processing units and/or logic elements may also be included in embodiments of the target hardware system 140.

For at least one embodiment, the coordinating elements 160 provide a mechanism to provide target code for the appropriate processing unit(s) of the target hardware system 140, without requiring that the compiler 120 provide compilation support for each of the different types of processing units/logic elements in the target hardware system 140.

Instead, the coordinating elements 160 include a set 134 of "variants", which are runtime library components. Each of the variants provides target code, for a particular task, for a particular type of processing unit or logic element in the target hardware system 140. For at least one embodiment, variants are functions that share the same name, interface and functionality but that have different implementations.

Two variants may be written to implement the same function, but may be implemented for different hardware elements of the target hardware system 140. Consider a heterogeneous target hardware system 140, for example, that includes both a general purpose processor and a graphics accelerator.

Figure 2:
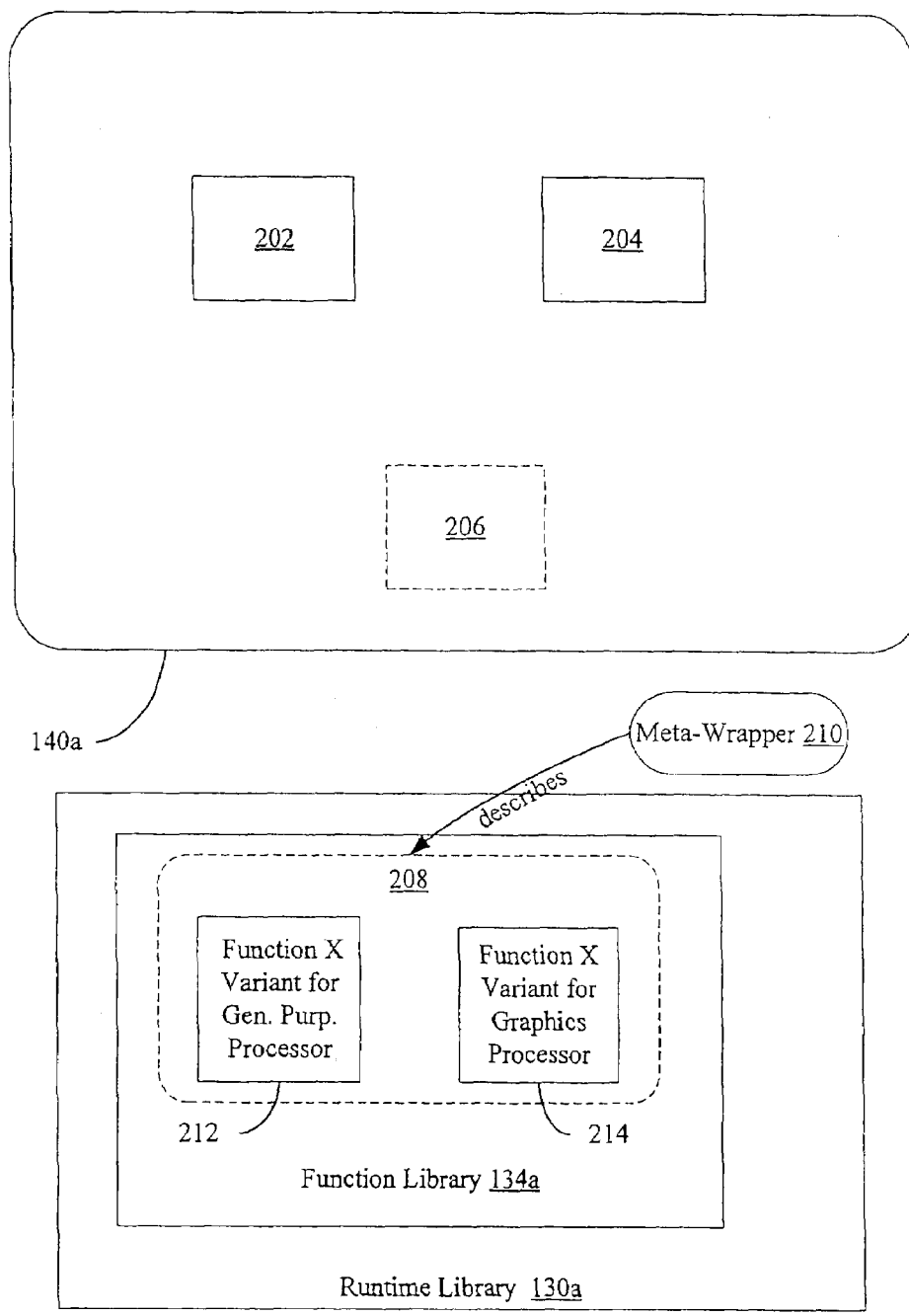
FIG. 2 is a block diagram illustrating run-time library variants in at least one example embodiment of a run-time library.

Turning briefly to FIG. 2, presented is a sample embodiment of a heterogeneous target hardware system 140a. The system 140a includes a general purpose processing unit 202 and a graphics accelerator 204. Optional additional processing elements 206 are denoted with a broken line to indicate their optional nature. The optional additional processing elements 206 may include one or more general processing units, one or more additional graphics processors, one or more other accelerators, one or more reconfigurable logic elements (such as a field programmable gate array) and/or other processing elements.

For the sample embodiment illustrated in FIG. 2, the runtime library 130a supports a function X that performs a specific task. FIG. 2 illustrates that the function library 134a may include at least two variants for the given function (e.g., Function X). One of the variants, 212, is a runtime library routine (e.g., software code) implemented for the general purpose processor 202. The other variant, 214, is a runtime library routine implemented for the graphics processor 204. Each of the variants 212, 214 has the same name (X), the same interface, and the same functionality. Each of the variants 212, 214 in the function library 134a may satisfy the semantics of a "task", namely that it may be performed concurrently with other tasks. In some instances, the task does not interact with any global variable. Alternatively, the task may be performed concurrently if it utilizes a mechanism, such as locks or transactional memory mechanisms, such that any side effects with respect to global variables are masked from other tasks. In either case, variants are "tasks" in the sense that multiple instances of a function can be safely executed concurrently.

Returning to FIG. 1, it is shown that the compiler 120 may optionally include a bundler 124 and pattern converter 126. The bundler 124 need not necessarily be part of the compiler 120. For at least one alternative embodiment, the bundler 124 may instead comprise a pre-compilation tool separate from compiler 120. Similarly, the pattern converter 126 need not necessarily be part of the compiler 120. It 126 may instead be, for at least one embodiment, a pre-compilation tool separate from the compiler 120. In such cases, if the bundler 124 and/or pattern converter 126 are not part of the compiler 120, then the compiler 120 is adapted to receive and process inputs from the separate tool(s) 124, 126. The optional nature of whether the bundler 124 and/or pattern converter 126 are part of the compiler 120 or are implemented as separate tools is indicated in FIG. 1 with broken lines.

FIG. 1 illustrates that the compiler is to receive application source program 102 written by a programmer. The source program 102 may include statements of any high-level programming language including, but not limited to, OpenC++ or C++. The source program 102 may also include special statements, known herein as "keywords", which are not part of the standard programming language but are instead constructs of a parallel programming language, discussed in further detail below.

The compiler 120 converts the code of the program 102 into standard compiled code of the high-level programming language (such as C++), such that the compiled code 104 interfaces with the runtime library 130. That is, the compiler 120 translates a source program 102 that includes both (1) statements of the high-level programming language and (2) parallel programming keywords into a compiled binary 104 that includes (1) standard compiled code of the high-level programming language and (2) calls into the runtime library 130. During compilation, the compiler 120 maps the parallel programming keywords of the source application 102 to functions in the runtime library 130 and outputs compiled code 104 that includes calls to the runtime library 130.

For at least one embodiment, the parallel programming keywords that may be used in the source code 102, and that may be recognized by the compiler 120 and mapped to functions of the library 130, are from a specified set of parallel programming keywords. This set of parallel programming keywords form a parallel programming language extension that may augment traditional high-level programming languages. For at least one embodiment, the keywords of at least one embodiment of the parallel programming language include "mapreduce" (discussed below), "pipeline", and "transaction".

These specified parallel programming keywords are recognized by the compiler; the corresponding library functions are supported by a library developer. As such, as is mentioned above, the keywords are constructs of a library-based parallel programming language augmentation, or extension, for high-level programming languages.

In deriving the keywords that are specified for the parallel programming language, it is noted that many parallel applications can be described by high-level patterns. One of these patterns is the map/reduce pattern. Other patterns that may be incorporated into the high-level programming language include pipeline parallelism and transactions. Each of these patterns may be expressed in the parallel programming language as a keyword or keywords in the source code 102.

As is discussed above, all function variants in the function library 134 are "tasks". For at least one embodiment, tasks can directly communicate with other tasks only through calling subtasks or returning to the parent task. For at least one embodiment, tasks may communicate indirectly through their arguments. Also, for at least one embodiment, a task can have dependent tasks other than its direct parent.

For at least one embodiment, tasks are identified by values drawn from a tuple space. For explicit data parallelism, the tuple space might directly map to the unique addresses of data in a multi-dimensional structure, but such a direct mapping is not required. The mapping between the tasks' tuple space and their data is the responsibility of an iterable "collection" type. For at least one embodiment, all function arguments are wrapped in these collections. A collection type may not actually contain any data, and may just contain the information to define the tuple space and map that space to the relevant data. Example collection types, Array1D and Array2D, are discussed below in connection with FIG. 3.

As is shown in FIG. 1, the compiler 120 may include a bundler 124. Alternatively, the compiler 120 may be configured to receive information from the bundler 124, for embodiments where the bundler 124 is implemented as a pre-compilation tool. For at least one embodiment, the bundler 124 may be conceptually akin to a library manager.

Reference is now made to FIGS. 1 and 2 jointly. The variants 212, 214 in the function library 134 of the runtime library 130 may be conceptualized as a pool of specific code implementations, each targeted for a particular hardware target. Some of these variants 212, 214 may be bundled together into a "generic function" 208. A generic function 208 describes a collection of variants 212, 214 of the same name, number of arguments, and result types. For each keyword in the source code 102, the bundler 124 of the compiler 120 provides one or more bundled generic functions, rather than a specific variant. Such bundling allows the runtime to select from a choice of variants in the bundle during runtime in order to more effectively dispatch tasks to specific elements of the target hardware 140 during runtime.

For at least one embodiment, the bundler 124 performs an analysis and creates a set of one or more meta-wrappers 210 for each generic function 208. The bundler 124 bundles together the appropriate variants to create one or more meta-wrappers 210 for a generic function 208 associated with one of the specified keywords of the parallel programming language discussed above. During run-time, the meta-wrappers 210 may be utilized by the dispatch engine 132 to invoke the most-specific applicable variant belonging to the generic function (see, e.g., further discussion of operation 440 of FIG. 4, below). For at least one embodiment, the meta-wrapper 210 is the implementation of the generic function, and contains the necessary conditionals and function calls to perform dispatch. The meta-wrapper 210 is a function that only calls other functions.

The bundler 124 may, for at least one embodiment, re-generate the meta-wrapper(s) 210 for the generic function 208 each time the source code 102 is compiled. That is, the meta-wrapper(s) 210 may be automatically generated each time the source code 102 is compiled by the compiler 120. One advantage of this approach is that new variants, targeted to additional hardware, may be added without the need to manually modify a pre-existing wrapper and without the need for the library author to create a new wrapper. In one aspect, this allows improved flexibility for the coordinating elements 160 to accommodate additional variants without manual overhead. Each variant can thus stand alone and can be added to the runtime library 130 with little modification of other components of the system 100.

One mechanism that is used by the bundler 124 to bundle the variants together for a meta-wrapper is annotation. For at least one embodiment, annotations are supplied by the library author for each function variant 134 in the runtime library 130. For at least one embodiment, the analysis performed by the bundler 124 includes processing based on annotations. The annotations may be supplied in an annotation language. For at least one embodiment, the annotation language supports at least three types of annotations: predicates, groups, and traits.

Predicate annotations may be used by the runtime in variant selection. Group annotations are used by the bundler 124 to collect variants together. Traits are typically used by the runtime to control execution.

Example predicates include constraints on input vector length, the underlying data organization of a multidimensional array or the targeted architecture. All predicates take the form of logical axioms and may include literals, enumerations, access to formals and fields in scope, and a set of basic arithmetic and relational operators on integers and floating point values. Unlike more object-oriented predicated dispatch systems, the variants do not need to be unambiguous or exhaustive. It is assumed that some variants will be equivalent over a subset of the parameter space, and a secondary ordering mechanism, such as compile time order, or profiling, is used to determine dispatch order. Ordering and equivalence checking is performed in the context of groups. Analogous to class hierarchies, variants are ordered within their particular group, and any valid variant in a given group would be invoked before any variants in the parent group, regardless of specificity. All the variants in a group, as well as all in its parents may be considered when checking for exhaustiveness.

For at least one embodiment, the bundler 124 produces three meta-wrappers for each function. These three meta-wrappers include a call meta-wrapper, a lookup meta-wrapper, and a speculative lookup meta-wrapper. The call wrapper simply calls the selected variant, while the lookup wrapper returns a function pointer to the variant. Both the call and lookup wrappers require that suitable variants exist and are exhaustive. Speculative lookup support does not have such a requirement and will support the lookup of variants that do not exist, simply returning a null function pointer if no suitable variant is available.

FIG. 1 illustrates that the compiler 120 may include the pattern converter 126. Alternatively, the compiler 120 may be configured to receive information from the pattern converter 126, for embodiments where the pattern converter 126 is implemented as a pre-compilation tool. The pattern converter 126 converts the parallel programming keywords of the source code 102 to standard code of the high-level programming language in which the source code is written (such as, e.g., C++), where the converted code interfaces with the runtime library 130.

Figure 3:
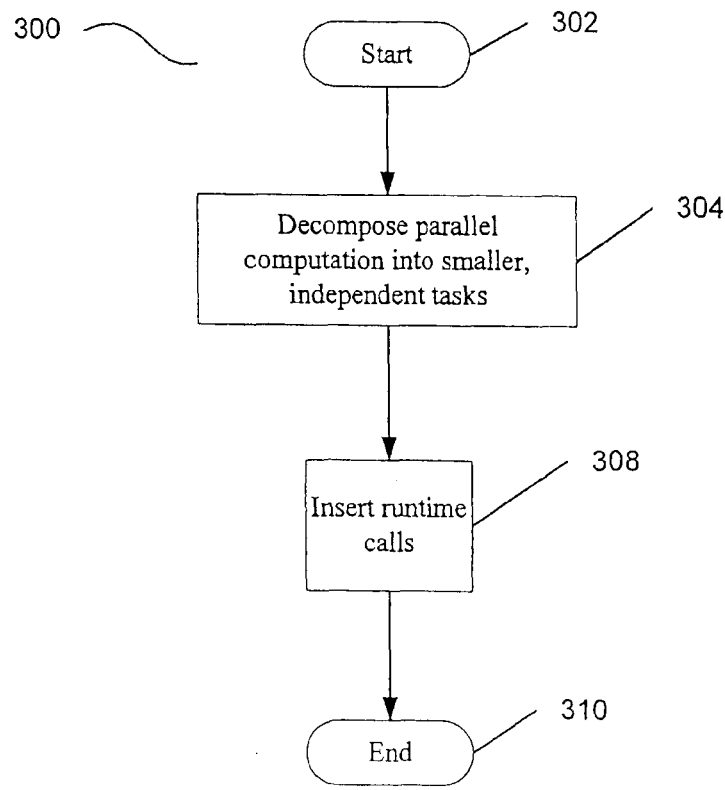
FIG. 3 is a flowchart illustrating at least embodiment of pattern conversions.

For at least one embodiment, the conversion performed by the pattern converter 126 includes the operations shown in FIG. 3. Generally, FIG. 3 illustrates that pattern conversion involves (1) translating the possibly nested generator statements into a multi-dimensional blocked range which will then drive execution, (2) inserting speculative function look-ups for all and unit variants for the map and reduction kernels and (3) inserting runtime calls to invoke the all variant or iteratively invoke the unit variants as appropriate.

FIG. 3 illustrates at least one embodiment of the method 300, which may be performed by a pattern converter (see, e.g., 126 of FIG. 1), where the pattern converter is implemented as part of the instructions of a compiler, stored on a machine-accessible medium. Alternatively, the method 300 may be performed by a pattern converter (see, e.g., 126 of FIG. 1) that may be implemented in hardware, firmware, or any combination of hardware, firmware, and software.

FIG. 3 illustrates that the method 300 begins at block 302 and proceeds to block 304. At block 304, the computation associated with a parallel programming keyword in a source program (such as, e.g., source code 102 of FIG. 1) is decomposed. During the decomposition, the computation is divided into those tasks that are independent (and thus may potentially be performed concurrently) and those tasks that are not independent. For example, a keyword indicating the map_reduce function may be decomposed at block 304 into a set of map operations and a set of reduce operations. The map operations may be independent, and thus potentially concurrent. In contrast, the reduce operations may depend on output generated by the map operations, and therefore cannot be performed concurrently with the map operations.

Continuing with the map_reduce example, consider the following pseudo-code statement that may be included in a sample user program. Assume that dp, cc, and ccnew have been declared as 2-D array (of collection type Array2D, as described below) having a certain number of rows. Further assume that hist has been declared as a 1-D vector (of collection type Array1D, as described below) having integer elements:

```
mapreduce (int i=0; i< dp.rows; i++) {
    kdmp (dp[i],cc,red<sum>(ccnew), red<sum>(hist));
}
```

Using this "mapreduce" keyword construct, the user may indicate the desire to perform a map-reduce function on the 2-D array called dp.

For at least one embodiment, the mapreduce parallel programming construct has three parts. The first part is the generator statement(s). Second is the map function itself. Third, the construct may optionally include the reduce function.

The generator statement(s) drive the map operation by creating the task tuple space. For the sample pseudocode statement indicated above, the generator statement is "mapreduce (int i=0; i<dp.rows; i++)". This statement creates the task tuple space over which the map function is to be performed. In this example, the tuple space is the row indices of dp (from 0 to dp.rows). For such example, the map function (kmdp) is mapped over the rows of dp (as indicated by the array subscript). These tasks may be performed independently, in parallel.

Regarding the second element of the construct, the map function, the pseudocode above shows that the map function is "kdmp". This is the task to be performed for all iterations (each row of dp) in the tuple space.

Regarding the third element, the sample pseudocode above does include a reduce function, "red<sum>". For each iteration of the kdmp function (e.g., for each operation of kdmp on a row of dp), the array ccn and the vector hist are reduced, summing the results for each map invocation.

For at least one embodiment, the pattern converter (e.g., 126 of FIG. 1) of the compiler translates the generator statement(s) of the parallel programming construct in the user program to a multi-dimensional blocked range. The blocked range concept describes a dimensional iteration space that can be recursively split into progressively smaller regions. The depth of the recursion determines the extent of the parallelism, with each split creating two potentially concurrent computational tasks.

At block 304, the parallel programming constructs may be directly mapped to a blocked range. For embodiments where they are directly mapped to a blocked range, the parallel programming keywords are limited to those which can be directly mapped to a contiguous range at compile time. For at least one embodiment, the blocked range serves as the index for task identification and also serves as an index for iteration through input and output collections.

For at least one embodiment, the pattern converter (e.g., 126 of FIG. 1) utilizes generator statement(s) in conjunction with "collections" to provide data decomposition and task mapping. For example, for the pseudocode statements set forth above, it was assumed that the data for the mapreduce function had been declared as 2-D arrays and a 1-D vector. For at least one embodiment, these data 2-D and 1-D data structures may be declared as predefined "iterable collection" types Array1D and Array2D, respectively.

The collections may define a mapping between a tasks' tuple space and the data mapped to that space. Tasks may be uniquely identified by values drawn from the tuple space. The mapping between the tasks' tuple space and their data is the responsibility of the collection, and all function arguments may be wrapped in these collections. A collection type, such as Array2D and Array1D, may not actually contain any data. A collection may instead include information to provide the tuple mapping to the actual data.

From block 304, processing proceeds to block 308. At block 308, runtime calls are inserted into the compiled program. Speculative lookup calls may be inserted to find a particular type of variant, referred to as "all" variants, for the keyword operations (the actual lookups are performed at runtime). An all variant is one that operates on multiple leaves and/or joins in the dataflow, effectively short-circuiting the generic parallelism of the map/reduce construct, deferring instead to the function.

The runtime calls inserted at block 308 may invoke the all variant for a keyword function or, alternatively, may iteratively invoke the unit variant, as appropriate. Based on the results of the lookups at runtime, one of three execution scenarios are possible: all functions have all variants; at least one, but not all functions have all variants; or no functions have all variants. When available, the all variants are invoked directly, otherwise the units are invoked with parallel loop calls into the runtime, using the recursive splitting of the blocked range to drive parallel execution. After recursive splitting, the task space is divided into a set non-overlapping blocks, each representing a subset of the problem. The lookup procedures are repeated, enabling all variants to be found and invoked for these blocks before defaulting to sequentially executing the unit variant. The additional set of lookups is an optional feature that enables recursive parallel task decomposition without explicit blocking. From block 308, processing ends at block 310.

Returning to FIG. 1, it can be seen that the coordinating elements 160 include not only the compiler 120, but also a runtime library 130. Certain aspects of at least some embodiments of the compiler 120, such as pattern conversion and bundling, have been discussed above, as have certain aspects of variants that may reside in the function library 134. We now turn our focus to those aspects of the runtime library 130 that may operate during runtime execution of the compiled code 104.

FIG. 1 illustrates that the coordinating components 160 include a dispatch engine 132. The dispatch engine 132 dynamically determines which of the hardware resources should execute each task, and dispatches the task from a queue for execution on the selected hardware resource. In this manner, the dispatch engine 132 is a predicate-based runtime library component for managing and dispatching function variants for multiple architectures.

As is stated above, the bundler 124 creates one or more library meta-wrappers 210 for each keyword function. The pattern 126 converter then embeds runtime calls, based on these wrappers, 210 in the compiled code 104. When one of these calls is executed during runtime, a task is placed into a task queue. The wrapper associated with the task in the task queue may be referred to herein as its dispatch wrapper.

During runtime, the dispatch engine 132 is responsible for popping tasks off the task queue and dispatching it for execution on the appropriate hardware processing unit. The wrapper is used to perform predicated dispatch of the task. Ordering and equivalence checking is performed in the context of groups. Analogous to class hierarchies, variants are ordered within their particular group, and any valid variant in a given group would be invoked before any variants in the parent group, regardless of specificity. All the variants in a group, as well as all in its parents, are considered by the dispatch engine 132 when checking for exhaustiveness.

Figure 4:
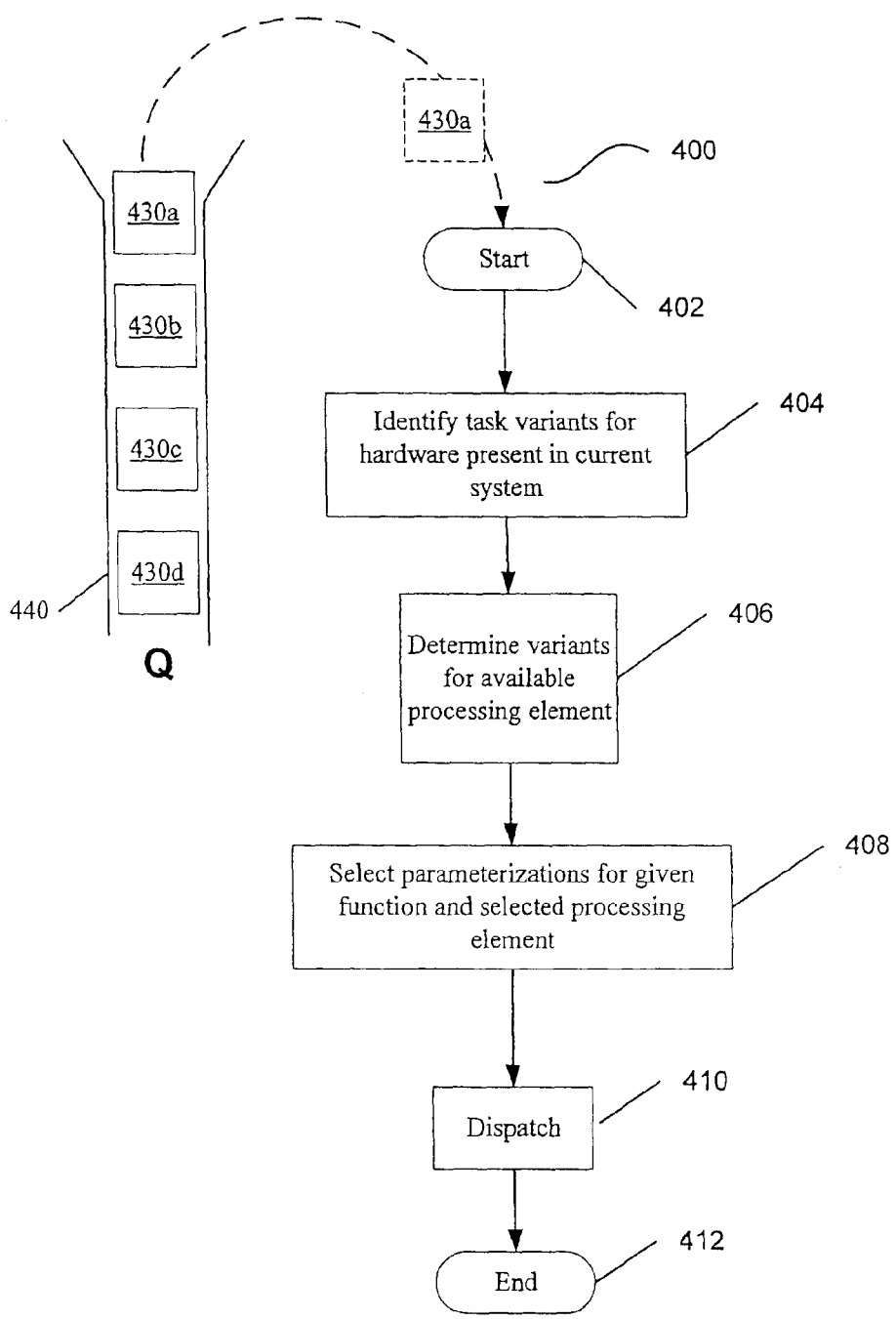
FIG. 4 is a control- and data-flow diagram illustrating at least one embodiment of a method for dynamic run-time dispatch of function variants on targeted hardware processing elements.

At least one embodiment of the ordering of function lookups and resulting actions performed by the dispatch engine 132 at runtime are set forth in FIG. 4. FIG. 4 illustrates at least one embodiment of a method 400 for performing variant lookups at runtime. For at least one embodiment, the method 400 is performed by the dispatch engine (e.g., 132 of FIG. 1) in order to dynamically select, during execution, the "best" available function variant for a task 430. For at least one embodiment, the method 400 is performed in response to popping a task 430a from a task queue 440 during runtime. The task queue 440 may be a generic, architecture-agnostic queue that holds all tasks (in contrast, for example, to having multiple tasks queues that may be specific to particular functions or types of processing units).

FIG. 4 illustrates that the method 400 begins at block 402 and proceeds to block 404. At block 404, the potential variants for the task 430 are narrowed to those for processing elements available in the target hardware system. The dispatch wrapper for the function associated with the task 430a indicates, due to the annotations discussed above, which variants support which processing elements. That is, as discussed above, each variant in the runtime library (e.g., 134 of FIG. 1) has been annotated by its author with information such as a specification of the target architecture for the variant, as well as applicable data patterns and other information. This type of information for all of the variants for a function is translated into the dispatch meta-wrappers that are used by the runtime at block 404 to select a set of potential variants for the task 430, based on the hardware configuration of the current target system. From block 404, processing proceeds to block 406.

The dispatch wrappers, along with an entry in the task queue 440, are utilized at block 406 to select a variant for a specific processing element that is idle or otherwise immediately available for work. That is, at block 406 an available processing element is identified and selected. The selection from among available processing elements at block 406 considers, of course, which processing elements are available for work, but may also consider other runtime factors. These factors may include, for example, a load balancing policy.

Additional factors may also be used to inform the selection of a particular hardware processing element at block 406. For example, a particular processing element may be selected at block 406 based, at least in part, on geographic affinity—that is, the processing element's physical proximity to other processing elements that are of interest for some reason. Such reasons may include, for example, physical distance between processing elements that are selected for computations related to same instance of a programming keyword. Such reasons may also include, for example, the proximity of the selected processing element to a particular memory or cache element.

Once the processing element has been identified at block 406, then the variants applicable for the identified processing element are identified. After the set of variants for the selected processing element have been identified, processing then proceeds to block 408.

At block 408, the particular variant is selected and dispatched for execution on the processing element. Predicate and group annotations may be utilized at block 406 to determine the most-specific applicable function. The particular variant may be selected, for example, to work on the desired granularity of data. Such selection may be based, at least in part, on the predicate annotation for a variant, which may indicate constraints on the structure and size of inputs. Consider, for example, a wrapper that includes variants for the kdmp function, discussed above. One of the variants may be an implementation of kdmp on a particular general purpose processor. Another may be an implementation of kdmp on a particular type of graphics processing unit. The particular graphics processing unit may, for example, support 8-wide SIMD execution. Such a variant, then, is limited to operating on input vectors of length 8.

For at least one embodiment, predicates resolve to a Boolean value, and may include literals, enumerations, access to arguments and fields in scope, and a set of basic arithmetic and relational operators on integers and floating point values, assuming that all arithmetic expressions are linear. Thus, when determining whether a variant is applicable at block 406, a function variant is applicable if its predicates evaluate to "true" for the actual arguments.

Groups provide for hierarchical collections of variants, and may be used to express hierarchy of the processing elements. All of the variants belonging to a given generic function provide an exhaustive collection of variants, so that there is an applicable variant for the entire parameter space. At block 408, exhaustiveness checking is performed in the context of groups. All variants in a group, as well as all variants in its parent, grandparent or other direct ancestor, are considered for exhaustiveness.

A variant is the most specific if it is in the most specific group and overrides all other applicable variants. Variant $m_1$ overrides $m_2$ if the predicates of $m_1$ logically imply the predicates of $m2$. For example, if $m_1$ predicates are $0<=x<10$, and $m_2$ predicates are $0<=x<100$, then $m_2$ will be true if $m_1$ is true. Thus, $m_1$ implies $m_2$.

It is not necessarily required, for at least some embodiments, that the variants be unambiguous. At least some variants may indeed be ambiguous. It is therefore assumed that multiple variants may be applicable, although not necessarily uniquely more specific, over a subset of the parameter space.

Accordingly, for at least one embodiment it is assumed that some variants will be equivalent over a subset of the parameter space. In such cases, the dispatch engine may employ, at block 408, a secondary ordering mechanism to select a specific variant. Such secondary ordering mechanisms may include, for example, compile time order or profiling.

Similar to exhaustiveness checking, ordering analysis is performed at block 408 in the context of groups. Variants are ordered within their group, such that any applicable variant in a group is invoked at 408 in preference over any applicable variant in its parent group. In other words, child groups are more specific.

For example, a high-performance variant implemented to be highly optimized for a specific accelerator is preferred for selection at block 408. A more generic variant, such as, for example, a variant to perform the operation in a less optimized manner on a general processing unit, would only be invoked if the predicates for the more specific variant do not evaluate to "true". This could happen, for example, if the data to be operated upon is not a match in size or type for the specific variant, or if the specific accelerator (such as, for example, a graphics accelerator) is not present in the current system. In such case, the more generic variant of the parent group may be selected at block 408.

The predicates and hierarchical grouping discussed above is based, at least in part, on the observation that accelerators are typically optimized for specific data patterns. Thus, variants directed toward optimized implementations of a function for specific hardware accelerators may perform poorly or, in the worst case, be unusable for computations that fall outside the optimized regime of the variant. Graphics processing units, for example, may be particularly sensitive to the number of threads created, and may be limited in their ability to vectorize threads. One too many threads (e.g., 33 threads for a processing element architecture that supports 32 thread contexts), or a change in vector length (e.g., 8 to 12), for instance, may result in an increase in execution time for the function that is disproportionate to the increase in workload size.

At block 408, the selection among variants may also be based, at least in part, on the variants' resource requirements. For example, of two applicable variants, one may be faster but may use more bandwidth or cache capacity. One or the other of the two applicable variants may be selected at block 408 based on consideration of system conditions.

Execution of the selected variant is dispatched to the selected processing element at block 410. Processing then ends at block 412.

In sum, FIG. 4 illustrates a method 400 by which tasks 430 may be retrieved from a task queue 440 and dispatched for execution on specific processing elements as they become idle. This may be performed during runtime, thereby dynamically distributing complex computations across heterogeneous cores. It should be understood that, although FIG. 4 illustrates that tasks 430 from the task queue 440 are popped off the stack and dispatched serially, that is not necessarily the case.

For at least one embodiment, multiple tasks may be processed for dispatch at the same time. Even if this is not the case, an embodiment involving processing of one task at a time from the task queue 440 nonetheless represents parallel processing of complex tasks. This is because complex computations have been broken down into smaller tasks 430, by the pattern conversion method 300 discussed above. The smaller tasks 430, having been pushed onto the task queue 440, may be performed in parallel by dispatching them, at successive iterations of block 410, to different processing elements in order to achieve parallel processing of the tasks.

In the foregoing discussion, embodiments of the system discussed therein focus on exploiting heterogeneous systems by assembling multiple implementations ("variants") of a function, each variant targeting different processing elements (e.g., CPUs, accelerators, etc.), such that the variants can be invoked during runtime to dynamically distribute computations across all available cores.

While some known parallel programming languages are compiled to directly exploit architectural features of the specific target hardware system, embodiments of the invention encompassed by the appended claims, below, are devised to avoid limitations of the direct compilation approach. By bundling multiple variants into one wrapper, as discussed above, multiple different processing elements may be supported for a desired function. Functions are therefore extensible. A function can be extended for additional processing elements simply by creating new variants, and updating the dispatch wrapper to include the new variant. This extensibility occurs without requiring re-compilation of the user application.

Figure 5:
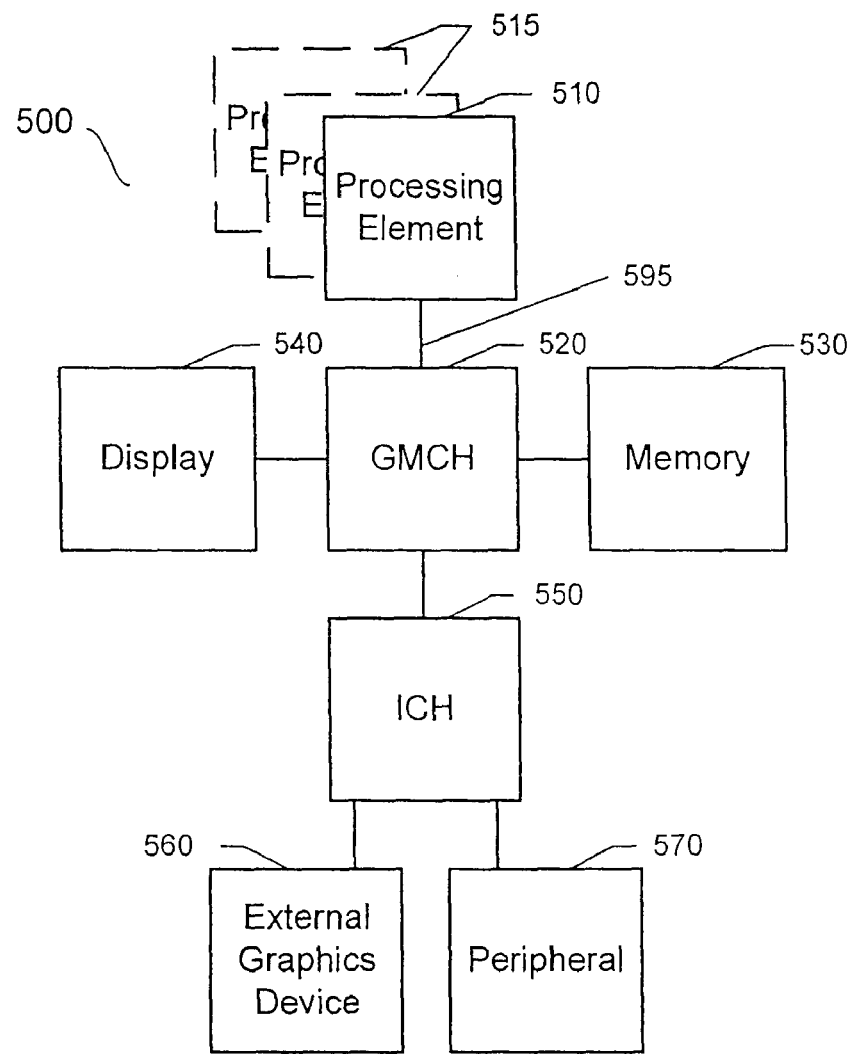
FIG. 5 is a block diagram of a system in accordance with at least one embodiment of the present invention.

Referring now to FIG. 5, shown is a block diagram of a system 500 in accordance with one embodiment of the present invention. As shown in FIG. 5, the system 500 may include one or more processing elements 510, 515, which are coupled to graphics memory controller hub (GMCH) 520. The optional nature of additional processing elements 515 is denoted in FIG. 5 with broken lines.

FIG. 5 illustrates that the GMCH 520 may be coupled to a memory 530 that may be, for example, a dynamic random access memory (DRAM). The GMCH 520 may be a chipset, or a portion of a chipset. The GMCH 520 may communicate with the processor(s) 510, 515 and control interaction between the processor(s) 510, 515 and memory 530. The GMCH 520 may also act as an accelerated bus interface between the processor(s) 510, 515 and other elements of the system 500. For at least one embodiment, the GMCH 520 communicates with the processor(s) 510, 515 via a multi-drop bus, such as a frontside bus (FSB) 595.

Furthermore, GMCH 520 is coupled to a display 540 (such as a flat panel display). GMCH 520 may include an integrated graphics accelerator. GMCH 520 is further coupled to an input/output (I/O) controller hub (ICH) 550, which may be used to couple various peripheral devices to system 500. Shown for example in the embodiment of FIG. 5 is an external graphics device 560, which may be a discrete graphics device coupled to ICH 550, along with another peripheral device 570.

Because system 500 is configured with a separate external discrete graphics device 560, the integrated graphics within GMCH 520 may be disabled. For example, the system basic input/output system (BIOS) may program a disable bit, or another mechanism may disable graphics functionality in GMCH 520. The otherwise idle processing resources used for graphics processing in GMCH 520 may instead be converted utilized as an additional processing element (e.g., a graphics accelerator) in accordance with an embodiment of the present invention.

In some embodiments, the processing elements for graphics functionality in the integrated graphics of GMCH 520 may include various graphics processing units to perform orthogonal functionalities. One or more of these processing resources may be configured as an ISA-based media accelerator exo-sequencer (described below) to implement media operations within system 500. For such embodiments, the graphics processing units may be treated as additional processing elements that may be available to do work as indicated above in connection with FIG. 4.

Alternatively, additional or different processing elements may also be present in the system 500. For example, additional processing element(s) 515 may include additional processors(s) that are the same as processor 510, additional processor(s) that are heterogeneous or asymmetric to processor 510, accelerators (such as, e.g., graphics accelerators or digital signal processing (DSP) units), field programmable gate arrays, or any other processing element. There can be a variety of differences between the physical resources 510, 515 in terms of a spectrum of metrics of merit including architectural, microarchitectural, thermal, power consumption characteristics, and the like. These differences may effectively manifest themselves as asymmetry and heterogeneity amongst the processing elements 510, 515. For at least one embodiment, the various processing elements 510, 515 may reside in the same die package.

Figure 6:
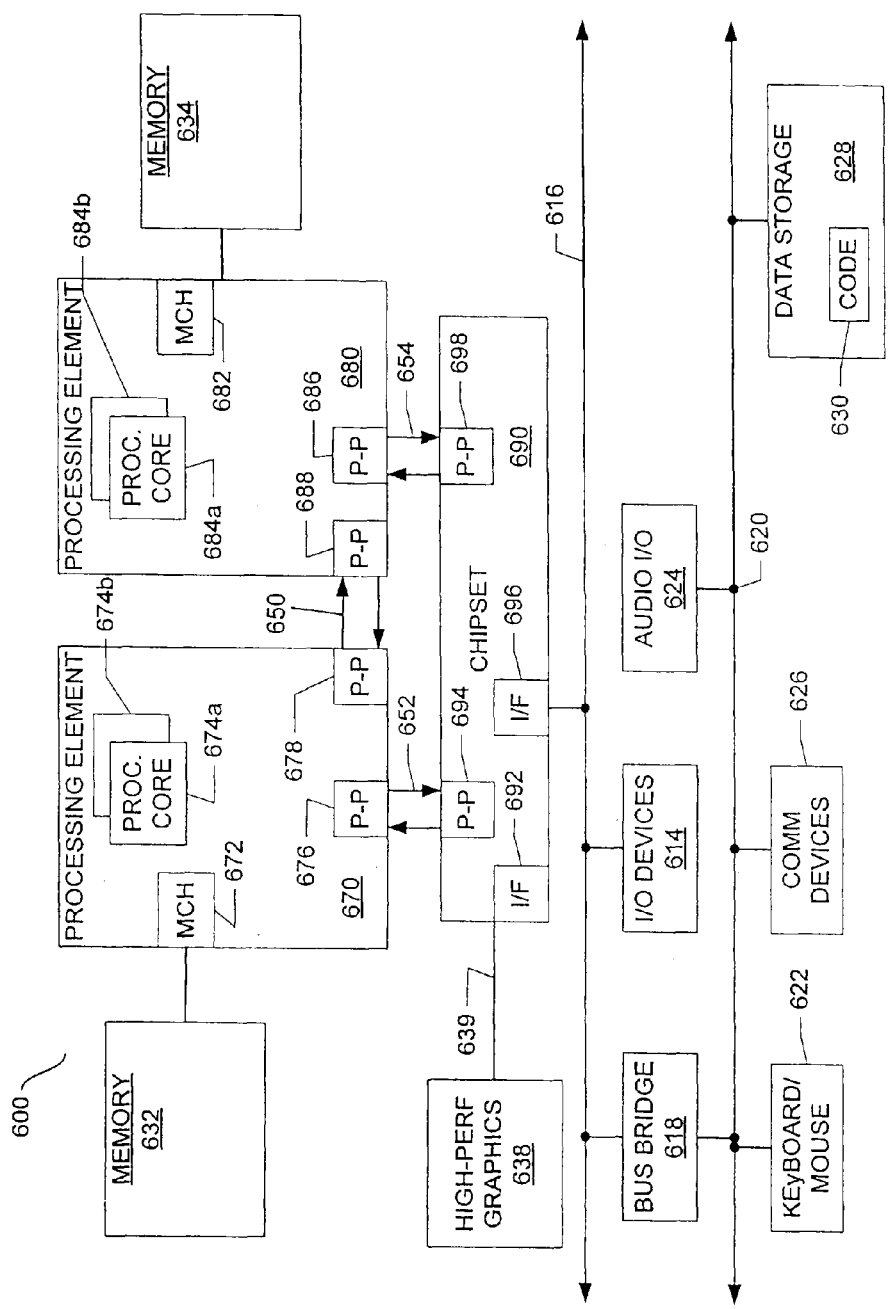
FIG. 6 is a block diagram of a system in accordance with at least one other embodiment of the present invention.

Embodiments may be implemented in many different system types. Referring now to FIG. 6, shown is a block diagram of a system 600 in accordance with an embodiment of the present invention. As shown in FIG. 6, multiprocessor system 600 is a point-to-point interconnect system, and includes a first processing element 670 and a second processing element 680 coupled via a point-to-point interconnect 650. As shown in FIG. 6, each of processing elements 670 and 680 may be multicore processors, including first and second processor cores (i.e., processor cores 674a and 674b and processor cores 684a and 684b).

Alternatively, one or more of processing elements 670, 680 may be an element other than a processor, such as an accelerator or a field programmable gate array.

While shown with only two processing elements 670, 680, it is to be understood that the scope of the present invention is not so limited. In other embodiments, one or more additional processing elements may be present in a given processor.

First processing element 670 may further include a memory controller hub (MCH) 672 and point-to-point (P-P) interfaces 676 and 678. Similarly, second processing element 680 may include a MCH 682 and P-P interfaces 686 and 688. As shown in FIG. 6, MCH's 672 and 682 couple the processors to respective memories, namely a memory 632 and a memory 634, which may be portions of main memory locally attached to the respective processors.

First processing element 670 and second processing element 680 may be coupled to a chipset 690 via P-P interconnects 676, 686 and 684, respectively. As shown in FIG. 6, chipset 690 includes P-P interfaces 694 and 698. Furthermore, chipset 690 includes an interface 692 to couple chipset 690 with a high performance graphics engine 638. In one embodiment, bus 639 may be used to couple graphics engine 638 to chipset 690. Alternately, a point-to-point interconnect 639 may couple these components.

In turn, chipset 690 may be coupled to a first bus 616 via an interface 696. In one embodiment, first bus 616 may be a Peripheral Component Interconnect (PCI) bus, or a bus such as a PCI express bus or another third generation I/O interconnect bus, although the scope of the present invention is not so limited.

As shown in FIG. 6, various I/O devices 614 may be coupled to first bus 616, along with a bus bridge 618 which couples first bus 616 to a second bus 620. In one embodiment, second bus 620 may be a low pin count (LPC) bus. Various devices may be coupled to second bus 620 including, for example, a keyboard/mouse 622, communication devices 626 and a data storage unit 628 such as a disk drive or other mass storage device which may include code 630, in one embodiment. The code 630 may include instructions for performing embodiments of one or more of the methods described above. Further, an audio I/O 624 may be coupled to second bus 620. Note that other architectures are possible. For example, instead of the point-to-point architecture of FIG. 6, a system may implement a multi-drop bus or another such architecture.

Embodiments of the mechanisms disclosed herein may be implemented in hardware, software, firmware, or a combination of such implementation approaches. Embodiments of the invention may be implemented as computer programs executing on programmable systems comprising at least one processor, a data storage system (including volatile and nonvolatile memory and/or storage elements), at least one input device, and at least one output device.

Program code, such as code 630 illustrated in FIG. 6, may be applied to input data to perform the functions described herein and generate output information. For example, program code 630 may include a run-time dispatch engine that performs an embodiment of the dispatch method 400 illustrated in FIG. 4. As another example, program code 630 may include instructions for the runtime variants (e.g., 212 and 214 of FIG. 2) of a function library 134 as shown in FIGS. 1 and 2. Accordingly, alternative embodiments of the invention also include machine-accessible media containing instructions for performing the operations of the invention or containing design data, such as HDL, which defines structures, circuits, apparatuses, processors and/or system features described herein. Such embodiments may also be referred to as program products.

Such machine-accessible storage media may include, without limitation, tangible arrangements of particles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the mechanisms described herein are not limited in scope to any particular programming language. In any case, the language may be a compiled or interpreted language.

Presented herein are embodiments of methods and systems for library-based compilation and dispatch to spread computations of a program across heterogeneous cores in a processing system. While particular embodiments of the present invention have been shown and described, it will be obvious to those skilled in the art that changes and modifications can be made without departing from the scope of the appended claims.

For example, one or more of the processing elements of the system may be an accelerator, or other non-CPU resource, that is coupled with an Instruction Set Architecture (ISA) extension that allows the non-CPU resource to be referenced as an ISA-based general purpose resource (referred to as an "exo-sequencer"). One can find further discussion of a system of this type in Wang, et al., "EXOCHI: architecture and programming environment for a heterogeneous multi-core multithreaded system," Conference on Programming Language Design and Implementation, Proceedings of the 2007 ACM SIGPLAN Conference on Programming Language Design and Implementation, Jun. 11-13, 2007, San Diego, Calif., USA, pp. 156-166. For such embodiment, the variant directed to such exo-sequencer may include a pragma to indicate that the variant is implemented for an exo-sequencer target.

Also, for example, the variants and other components of the mechanism discussed herein may be part of a managed runtime system. For such embodiments, for example, the variants may be dynamically generated rather than residing in a static runtime library (see, e.g., 134 of FIG. 1). Similarly, other components of the mechanism discussed herein, such as the meta-wrappers discussed above, may be dynamically generated. Such dynamic generation may occur, for example, during just-in-time compilation.

Accordingly, one of skill in the art will recognize that changes and modifications can be made without departing from the present invention in its broader aspects. The appended claims are to encompass within their scope all such changes and modifications that fall within the true scope of the present invention.

What is claimed is:

1. A computer-implemented method comprising:
bundling two or more hardware-specific variants of a run-time function into a generic function that corresponds to a parallel programming keyword of a parallel programming language;
generating one or more meta-wrappers for the generic function based on an annotation supplied for each of the two or more hardware-specific variants of the run-time function;
compiling source code of a user program that comprises (i) statements from a high-level programming language and (ii) the parallel programming keyword of the parallel programming language to generate a compiled binary of the user program, the compiled binary comprises (i) compiled code that corresponds to the statements from the high-level programming language and (ii) a run-time function call to the generic function embedded in the compiled binary as a function of the one or more meta wrappers;

during runtime execution of the compiled binary, (i) executing the run-time function call to the generic function and (ii) dynamically selecting a hardware-specific variant of the run-time function for a selected sub-task associated with the parallel programming keyword; and dispatching the selected hardware-specific variant for execution on a hardware processing element associated with the selected hardware-specific variant.

2. The method of claim 1, further comprising:

receiving as an input the user program; and identifying computations associated with the parallel programming keyword as sub-tasks that have no global side-effects.

3. The method of claim 2, wherein compiling source code of a user program to generate a compiled binary comprises compiling source code of the user program to generate a compiled binary that comprises multiple run-time function calls to the generic function, one for each of the sub-tasks.

4. The method of claim 3, further comprising:

during runtime execution of the compiled binary, dynamically selecting a hardware-specific variant of the run-time function for each of the sub-tasks.

5. The method of claim 1, wherein:

said dynamically selecting a hardware-specific variant is based, at least in part, on one or more annotations associated with the variant.

6. The method of claim 1, wherein:

said dynamically selecting a hardware-specific variant further comprises dynamically selecting the processing element to perform the selected sub-task.

7. The method of claim 6, wherein:

selecting the processing element is based, at least in part, on a load balancing policy.

8. The method of claim 2, wherein the run-time function call to the generic function further comprises a call to one of the one or more meta-wrappers.

9. An article comprising:

a tangible storage medium having a plurality of machine accessible instructions; wherein, when the instructions are executed by a processor, the instructions provide for:

bundling two or more hardware-specific variants of a run-time function into a generic function that corresponds to a parallel programming keyword of a parallel programming language;

generating one or more meta-wrappers for the generic function based on an annotation supplied for each of the two or more hardware-specific variants of the run-time function;

compiling source code of a user program that comprises (i) statements from a high-level programming language and (ii) the parallel programming keyword of the parallel programming language to generate a compiled binary of the user program, the compiled binary comprises (i) compiled code that corresponds to the statements from the high-level programming language and (ii) a run-time function call to the generic function embedded in the compiled binary as a function of the one or more meta wrappers;

during runtime execution of the compiled binary, (i) executing the run-time function call to the generic function and (ii) dynamically selecting a hardware-specific variant of the run-time function for a selected sub-task associated with the parallel programming keyword; and dispatching the selected hardware-specific variant for execution on a hardware processing element associated with the selected hardware-specific variant.

10. The article of claim 9, wherein said instructions further provide for:

receiving as an input the user program; and identifying computations associated with the parallel programming keyword as sub-tasks that may be performed concurrently.

11. The article of claim 10, wherein source code of a user program to generate a compiled binary comprises compiling source code of the user program to generate a compiled binary that comprises multiple run-time function calls to the generic function, one for each of the sub-tasks.

12. The article of claim 11, wherein said instructions further provide for:

during runtime execution of the compiled binary, dynamically selecting a hardware-specific variant of the run-time function for each of the sub-tasks.

13. The article of claim 9, wherein said instructions that provide for dynamically selecting a hardware-specific variant further provide for:

said dynamically selecting a hardware-specific variant is based, at least in part, on one or more annotations associated with the variant.

14. The article of claim 10, wherein said instructions further provide for:

said dynamically selecting a hardware-specific variant further comprises dynamically selecting the processing element to perform the selected sub-task.

15. A system, comprising:

a first processing element to implement a first hardware-specific variant of a run-time function;

a second processing element to implement a second hardware-specific variant of the run-time function;

a bundler to (i) bundle the first and second hardware-specific variants of the run-time function into a generic function that corresponds to a parallel programming keyword of a parallel programming language and (ii) generate one or more meta-wrappers for the generic function based on an annotation supplied for each of the first and second hardware-specific variants of the run-time function;

a compiler to generate a compiled binary from a user program that comprises (i) statements from a high-level programming language and (ii) the parallel programming keyword of the parallel programming language, wherein the compiled binary comprises (i) compiled code that corresponds to the statements from the high-level programming language and (ii) a run-time function call to the generic function embedded in the compiled binary as a function of the one or more meta wrappers;

a memory, the memory to store (i) code for the first hardware-specific variant of the run-time function implemented by the first processing element and (ii) code for the second hardware-specific variant of the run-time function implemented by the second processing element;

the memory further to store a dispatch engine to dynamically select, for a given task, between the first and second hardware-specific variant codes; and the dispatch engine further to dispatch the selected hardware-specific variant code for execution on the processing element for which the selected hardware-specific variant code is implemented.

16. The system of claim 15, wherein:
said dispatch engine is further to select between the first and second processing element.

17. The system of claim 16, wherein:
said dispatch engine is further to base the selection of processing elements based, at least in part, on runtime information concerning whether each processing element is currently available for work.

18. The system of claim 15, wherein:
said dynamic selection between said first and second hardware-specific variant codes is based, at least in part, on the selected processing element.

19. The system of claim 15, wherein:
said first processing element is a general purpose central processing unit.

20. The system of claim 15, wherein:
said second processing element is a graphics accelerator.

21. The system of claim 15, wherein:
said second processing element is a field programmable gate array.

22. The system of claim 15, wherein:
said first and second processing units are asymmetric general purpose central processing units having the same instruction set architecture but at least one other differing characteristic.

23. The system of claim 15, wherein:
said first and second processing units reside in the same die package.

24. The system of claim 15, further comprising:
one or more additional processing elements.

25. The system of claim 24, wherein:
the memory is further to store code for additional hardware-specific variants of the run-time function implemented for the additional processing elements.

* * * * *